United States Patent [19]

Christe

[11] 4,101,640
[45] Jul. 18, 1978

[54] PRODUCTION OF $OH_3^+$ SALTS

[75] Inventor: Karl O. Christe, Calabasas, Calif.

[73] Assignee: Rockwell International Corporation, El Segundo, Calif.

[21] Appl. No.: 859,786

[22] Filed: Dec. 12, 1977

Related U.S. Application Data

[63] Continuation-in-part of Ser. No. 767,010, Feb. 9, 1977, abandoned, which is a continuation-in-part of Ser. No. 625,398, Oct. 24, 1975, abandoned.

[51] Int. Cl.$^2$ .............................................. C01B 7/00
[52] U.S. Cl. ................................... 423/462; 423/483
[58] Field of Search ............................... 423/462, 489

Primary Examiner—O. R. Vertiz
Assistant Examiner—Thomas W. Roy
Attorney, Agent, or Firm—L. Lee Humphries; Robert M. Sperry

[57] ABSTRACT

Strong Lewis acids added to wet HF protonate the water to form stable $OH_3^+$ salts.

3 Claims, No Drawings

PRODUCTION OF OH$_3^+$ SALTS

The invention herein described was made in the course of or under a contract or subcontract thereunder, (or grant) with the United States Navy.

CROSS-REFERENCE TO RELATED APPLICATIONS

This application is a continuation-in-part of Ser. No. 767,010 filed Feb. 9, 1977 now abandoned, which is a continuation-in-part of Ser. No. 625,398 filed Oct. 24, 1975, and since abandoned.

BACKGROUND OF THE INVENTION

1. Field of the Invention

This invention relates to compositions of matter and methods of producing the same. More particularly, the present invention relates to stable OH$_3^+$ salts and methods of producing such salts by protonation of water from wet HF.

2. Description of the Prior Art

Hydrogen fluoride (FH) is widely used as a very good, inert, solvent. However, if the HF becomes wet, the water contained therein often tends to hydrolize the intended compounds. This destroys the compounds, sometimes with explosive results.

Numberous methods have been proposed heretofore for removing water from HF. Thus, it is known to react on alkali metal fluoride with HF to form the corresponding bifluoride, dry the bifluoride and pyrolize the biflouride to recover dry FH. Similarly, it has been known to remove water from HF electrolytically, using alternating current. Moreover, it has been known to treat HF with high pressure fluorine to remove water from the HF. Unfortunately, all of these prior art methods of removing water from HF are complicated, time-consuming and expensive. Furthermore, the latter method requires handling of gaseous fluorine under pressure which is quite hazardous to undertake.

BRIEF SUMMARY AND OBJECTS OF THE INVENTION

These disadvantages of the prior art are overcome with the present invention and a novel method of removing water from HF is proposed which is simple, fast, inexpensive and safe. Moreover, the method of the present invention yields a by-product which is useful and valuable.

The advantages of the present invention are preferably attained by adding a strong Lewis acid to wet HF to protonate the water into a solid, non-volatile residue. This residue is found to be an OH$_3^+$ salt, which is a strong solid acid and which is highly useful as a polymerization catalyst. The OH$_3^+$ salts are easily transported, are non-corrosive and are much safer to store and use than the liquid acids for which they may be substituted.

Accordingly, it is an object of the present invention to provide an improved method of removing water from HF.

Another object of the present invention is to provide a method of removing water from HF which method is simple, fast, economical and safe.

An additional object of the present invention is to provide a composition of matter which is a strong solid acid.

A further object of the present invention is to provide a composition of matter which is a strong solid acid which is highly useful as a polymerization catalyst.

Another object of the present invention is to provide a composition of matter which is a strong solid acid that is easily transported, non-corrosive, non-volatile, and safe to store and use.

A further object of the present invention is to provide stable OH$_3^+$ salts as a new composition of matter.

An additional object of the present invention is to provide a method of producing stable OH$_3^+$ salts.

A specific object of the present invention is the method of adding a strong Lewis acid to wet HF to protonate the water into a stable OH$_3^+$ salt.

These and other objects and features of the present invention will be apparent from the following detailed description.

DETAILED DESCRIPTION OF THE INVENTION

In that form of the present invention chosen for purposes of illustration, a strong Lewis acid is added to wet HF to protonate the water into a stable OH$_3^+$ salt. Suitable Lewis acids are SbF$_5$ or AsF$_5$.

EXAMPLE I

Preparation of OH$_3^+$SbF$_6^-$

In a typical experiment, SbF$_5$ (8.305 mmol) was placed in an ampoule and 8 ml of liquid anhydrous HF was added at $-196°$ C. The mixture was warmed to 25° C to give a homogenous solution. Next, the ampoule was rechilled to $-196°$ C and distilled water (8.30 mmol) was added. The mixture was then warmed to 25° C. Removal of all volatile material in vacuo at 25° C resulted in 2.116g of a white solid residue. The calculated weight for 8.30 mmol of OH$_3^+$SbF$_6^-$ is 2.115g. Moreover, a calculated analysis for OH$_3^+$SbF$_6^-$ yields H$_2$O 7.07; Sb 47.8 spectral analysis of the aforementioned residue yielded H$_2$O 6.93; Sb 48.0. The white solid was found to be stable up to 357° C, at which temperature it decomposed. The x-ray diffraction pattern for this material is shown in Table I.

TABLE I

| X-Ray Powder Data for OH$_3^+$SbF$_6^{-a}$ | | | | | |
|---|---|---|---|---|---|
| $d_{obsd}$, A | $d_{calcd}$, A | Intens | h | k | l |
| 8.75 | 8.77 | m | 0 | 0 | 1 |
| 4.78 | 4.80 | m | 2 | 0 | 1 |
| 4.38 | 4.39 | s | 0 | 0 | 2 |
| 3.47 | 3.49 | m | 2 | 0 | 2 |
| 3.32 | 3.34 | vs | 2 | 1 | 2 |
| 2.868 | 2.869 | mw | 4 | 0 | 0 |
| 2.785 | 2.784 | m | 4 | 1 | 0 |
| 2.241 | 2.251 | m | 5 | 1 | 0 |
| 2.199 | 2.194 | s | 0 | 0 | 4 |
| 2.053 | 2.049 | mw | 4 | 0 | 3 |
| | | | 2 | 0 | 4 |
| 2.021 | 2.017 | m | 2 | 1 | 4 |
| 1.901 | 1.903 | mw | 3 | 0 | 4 |
| 1.877 | 1.877 | m | 3 | 1 | 4 |
| 1.779 | 1.777 | mw | 6 | 2 | 1 |
| 1.760 | 1.756 | m | 5 | 4 | 1 |
| 1.680 | 1.679 | mw | 6 | 3 | 1 |
| 1.663 | | m | | | |
| 1.595 | | mw | | | |
| 1.578 | | m | | | |
| 1.515 | | vw | | | |
| 1.505 | | w | | | |
| 1.401 | | mw | | | |
| 1.392 | | m | | | |
| 1.347 | | mw | | | |
| 1.341 | | m | | | |
| 1.258 | | mw | | | |
| 1.220 | | m | | | |
| 1.187 | | mw | | | |
| 1.155 | | mw | | | |

TABLE I-continued

X-Ray Powder Data for $OH_3^+SbF_6^{-a}$

| $d_{obsd}$, A | $d_{calcd}$, A | Intens | h | k | l |
|---|---|---|---|---|---|
| 1.100 | | mw | | | |
| 1.075 | | mw | | | |
| 1.052 | | mw | | | |
| 1.030 | | mw | | | |
| 1.010 | | m | | | |
| 0.990 | | m | | | |
| 0.972 | | w | | | |
| 0.963 | | vw | | | |
| 0.937 | | m | | | |
| 0.922 | | m | | | |
| 0.9072 | | mw | | | |
| 0.8925 | | m | | | |
| 0.8793 | | m | | | |
| 0.8663 | | m | | | |
| 0.8538 | | m | | | |
| 0.8365 | | vw | | | |
| 0.8306 | | m | | | |
| 0.8251 | | w | | | |
| 0.8195 | | m | | | |
| 0.8144 | | w | | | |
| 0.8091 | | w | | | |
| 0.8037 | | w | | | |
| 0.7988 | | m | | | |
| 0.7890 | | m | | | |
| 0.7880 | | w | | | |
| 0.7794 | | m | | | |
| 0.7786 | | w | | | |

[a] Tetragonal, a = 11.48 A, c = 8.78 A, V = 1157.1 A, Z = 8, $p_{calcd}$ = 2.93 g cm$^{-3}$, Cu Kα radiation, and Ni filter.

EXAMPLE II

Preparation of $OH_3^+AsF_6^-$

In a typical experiment, H$_2$O (5.421 mmol) and anhydrous HF (8 ml of liquid) were combined at −196° C in an ampoule, followed by warm-up to 25° C. Arsenic pentafluoride (5.427 mmol) was added to this mixture at −196° C and the contents of the ampoule were allowed to warm slowly to room temperature. Removal of volatile material at 25° C in vacuo resulted in 1.128g of a white solid residue. The calculated weight for 5.421 mmol of $OH_3^{30} AsF_6^-$ is 1.127g. Furthermore, spectral analysis of the residue yielded H$_2$O 8.26; As 35.7, while the calculated analysis for $OH_3^+AsF_6^-$ yields H$_2$O 8.66; As 36.0. The white solid was found to be stable up to 193° C, at which temperature it decomposed. The x-ray diffraction pattern for the resulting material is shown in Table II.

TABLE II

X-Ray Powder Data for $OH_3^+AsF_6^{-a}$

| $d_{obsd}$, A | $d_{calcd}$, A | Intens | h | k | l |
|---|---|---|---|---|---|
| 4.64 | 4.62 | vs | 1 | 1 | 1 |
| 4.01 | 4.00 | vs | 2 | 0 | 0 |
| 2.82 | 2.83 | s | 2 | 2 | 0 |
| 2.420 | 2.414 | w | 3 | 1 | 1 |
| 2.315 | 2.312 | w | 2 | 2 | 2 |
| 1.999 | 2.002 | w | 4 | 0 | 0 |
| 1.833 | 1.837 | w | 3 | 3 | 1 |
| 1.785 | 1.791 | mw | 4 | 2 | 0 |
| 1.636 | 1.634 | m | 4 | 2 | 2 |
| 1.542 | 1.541 | mw | 5 | 1 | 1 |
| | | | 3 | 3 | 3 |
| 1.414 | 1.416 | vw | 4 | 4 | 0 |
| 1.355 | 1.353 | w | 5 | 3 | 1 |
| 1.336 | 1.335 | w | 6 | 0 | 0 |
| | | | 4 | 4 | 2 |
| 1.267 | 1.266 | vw | 6 | 2 | 0 |

[a] Cubic, a = 8.015 A, V = 514.9 A$^3$, Z = 4, $p_{calcd}$ = 2.890g cm$^{-3}$, Cu Kα radiation, and Ni filter Further characterization of $OH_3^+SbF_6^-$ and $OH_3^+AsF_6^-$ may be found in an article entitled, "Novel Onium Salts. Synthesis and Characterization of $OH_3^+SbF_6^-$ and $OH_3^+AsF_6^-$", published in Inorganic Chemistry, Vol. 14, No. 9, p.2224, September 1975 and written by K. O. Christe, C. J. Schack and R. D. Wilson.

EXAMPLE III

Preparation of Dry HF

Using the methods of either Example I or II, it is easy to separate dry HF from the $OH_3^+$ salt by distillation, since HF boils at 20° C.

Thus, the methods of Examples I or II, coupled with the step of Example III, have dual utility, serving to remove water from HF and, also, serving to produce stable solid $OH_3^+$ salts.

Obviously, numerous variations and modifications can be made without departing from the present invention. Accordingly, it should be clearly understood that the forms of the present invention described above are illustrative only and are not intended to limit the scope of the present invention.

I claim:

1. A composition of matter consisting of an $OH_3^+$ cation, and an anion consisting of the hexafluoride of a material selected from the group consisting of antimony and arsenic.

2. A composition of matter consisting of $OH_3^+SbF_6^-$ as a white solid which is stable up to 357° C, at which temperature it decomposes.

3. A composition of matter consisting of $OH_3^+AsF_6^-$ as a white solid which is stable up to 193° C, at which temperature it decomposes.

* * * * *